(12) United States Patent
Biskeborn et al.

(10) Patent No.: US 7,548,397 B2
(45) Date of Patent: Jun. 16, 2009

(54) MAGNETIC READER WITH PIGGYBACKED FENCE

(75) Inventors: Robert Glenn Biskeborn, Hollister, CA (US); Icko E. T. Iben, Santa Clara, CA (US); Peter VanderSalm Koeppe, San Diego, CA (US); Jason Liang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 11/281,734

(22) Filed: Nov. 16, 2005

(65) Prior Publication Data

US 2007/0109681 A1    May 17, 2007

(51) Int. Cl.
    *G11B 5/187* (2006.01)
(52) U.S. Cl. ........................................ 360/121
(58) Field of Classification Search .............. None
    See application file for complete search history.

(56) References Cited

U.S. PATENT DOCUMENTS

| 5,761,009 | A | 6/1998 | Hughbanks et al. ......... 360/113 |
|---|---|---|---|
| 5,930,086 | A | 7/1999 | Chaug et al. ................ 360/113 |
| 6,156,375 | A | 12/2000 | Hu et al. ..................... 427/116 |
| 6,301,084 | B1 | 10/2001 | Santyini ..................... 360/317 |
| 6,324,747 | B1 | 12/2001 | Boutaghou et al. ....... 29/603.12 |
| 6,607,923 | B2 | 8/2003 | Carr et al. ...................... 438/3 |
| 6,661,600 | B1 * | 12/2003 | Chliwnyj et al. ......... 360/77.12 |
| 6,687,083 | B2 | 2/2004 | Hsiao et al. ................. 360/126 |
| 6,760,199 | B2 | 7/2004 | Biskeborn ................... 360/323 |
| 6,804,083 | B2 * | 10/2004 | Takeya ....................... 360/122 |
| 2001/0019464 | A1 * | 9/2001 | Poorman et al. ............ 360/122 |
| 2002/0024764 | A1 * | 2/2002 | Takeya ....................... 360/122 |
| 2003/0002227 | A1 * | 1/2003 | Jarratt ........................ 360/319 |
| 2004/0017640 | A1 | 1/2004 | Hughbanks et al. ......... 360/323 |

* cited by examiner

*Primary Examiner*—Mark Blouin
(74) *Attorney, Agent, or Firm*—Zilka-Kotab, PC

(57) ABSTRACT

A magnetic head comprises a plurality of elements selected from a group consisting of readers and writers. A servo sensor is positioned towards the elements, the servo sensor being adapted for sensing a first servo track of a magnetic medium. A fence is positioned towards the servo sensor and aligned therewith in a tape travel direction. A magnetic head in another embodiment includes a substrate and a reader positioned above the substrate, the reader having a sensor and shields sandwiching the sensor. A fence is positioned towards the reader on an opposite side thereof from the substrate, the fence being aligned with the reader in a travel direction of a magnetic medium passing thereby.

15 Claims, 7 Drawing Sheets

MAGNETIC READER WITH PIGGYBACKED FENCE

FIELD OF THE INVENTION

The present invention relates to magnetic head structures, and more particularly, this invention relates to a magnetic head structure having a protective fence paired with a reader.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. The MR sensor transduces magnetic field changes in an MR stripe to resistance changes, which are processed to provide digital signals. Data storage density can be increased because an MR sensor offers signal levels higher than those available from conventional inductive read heads for a given bit area. Moreover, the MR sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

The quantity of data stored on a magnetic tape may be increased by increasing the number of data tracks across the tape. More tracks are made possible by reducing feature sizes of the read and write elements, such as by using thin-film fabrication techniques and MR sensors. In modern magnetic tape recorders adapted for computer data storage, read-while-write capability with MR sensors is an essential feature for providing fully recoverable magnetically stored data. The interleaved R/W magnetic tape head with MR, GMR, AMR, TMJ, etc. sensors allows increased track density on the tape medium while providing bi-directional read-while-write operation of the tape medium to give immediate read back verification of data just written onto the tape medium. A read-while-write head assembly includes, for each of one or more data tracks, a write element in-line with a read element, herein denominated a R/W pair, wherein the gap of the read element is closely-disposed to and aligned with the gap of the write element, with the read element positioned downstream of the write element in the direction of medium motion. By continually reading just-recorded data, the integrity of the recorded data is immediately verified while the original data is still available in temporary storage in the recording system. The recovered data is compared to the original data to afford opportunity for action, such as re-recording, to correct errors. The interleaved head contains two opposed modules, each of which contains interleaved R/W tracks. Alternate columns (track-pairs) are thereby disposed to read-after-write in alternate directions of tape medium motion. Tape heads suitable for reading and writing on high-density tapes also require precise alignment of the track-pair elements in the head assembly.

FIG. 1 illustrates a piggyback head module 100 which can also function as a portion of a read-while-write head. As shown, the head includes several R/W pairs 102 in a "piggyback" configuration. As with the interleaved heads, servo readers 104, which are not piggybacked, are positioned on the outside of the array of R/W pairs 102. The servo readers 104 follow servo tracks for the particular data "band" of the tape being read or written to, their signal being used to keep the head aligned within the band. The tape may have a single or many data bands, and each band may have one or more servo tracks. Typically, the servo tracks separate the data bands, and both servo readers in the head read servo data simultaneously for accurate positioning.

When the head is constructed, layers are formed on a substrate 110 in generally the following order for the R/W pairs 102: an insulating layer 112, a first shield (S1) 114, a sensor 116 also known as a read element, a second shield (S2) 118, and first and second writer pole tips (P1, P2) 120,122.

Of significance, note that writers are not formed over the shields surrounding the servo reader 104 since writers are not needed at these locations. Also of significance, note that in the interleaved head the servo readers and data readers are similar in form to the piggyback head servo readers.

Tape heads in particular suffer from head wear caused by motion of the magnetic recording tape. Repeated passes of the tape medium over the wear-resistant tape head surface may eventually selectively wear away the portion of the surface containing the read/write elements, which can impair head performance. This is a particular problem for thin-film magnetic heads where the thin-film layers may see relatively considerable wear with brief operation, giving an unacceptably rapid loss of signal for the magnetic head assembly. Practitioners in the art may provide wear-resistant layers on the air bearing surfaces of magnetic heads to inhibit wear, for example, a sputtered layer of diamond-like carbon or aluminum oxide, but such layers are also very thin, being perhaps 20 nanometers thick to minimize tape-to-head spacing loss, and must generally be deposited onto pre-recessed heads.

A particular wear problem is selective to the servo readers of piggyback heads and the servo and data readers of interleaved heads, which have been found to recess more than piggybacked data readers. This additional recession is disadvantageous for head-assembly life-expectancy. That the piggyback data readers experience less recession is believed to be due to the proximity of the more wear-resistant writer poles.

Another problem encountered with bare reader heads is that the read sensors are susceptible to failure due to shield-shorting as a result of running magnetic recording tape thereacross at very low humidity, which is found to produce accumulations of conductive material on the MR element and shields. The only known solution is to forcibly recess the sensor, so that its components do not develop the conductive accumulation. Such a recessed sensor has been implemented but is difficult to manufacture, and also results in an undesirable spacing loss for the data readers, which must read much higher frequencies than the servo readers.

Data and servo readers in the interleaved head are similar to the servo reader in the piggybacked head in regards to susceptibility to excess erosion and low humidity shorting with very smooth media There is accordingly a clearly-felt need in the art for a wear-resistant read/write head assembly having servo readers with improved wear characteristics and improved reliability. These unresolved problems and deficiencies are clearly felt in the art and are solved by this invention in the manner described below.

SUMMARY OF THE INVENTION

The present invention overcomes the aforementioned disadvantages by providing a magnetic tape head having a protective fence positioned towards particular sensors.

In one embodiment, a magnetic head comprises a plurality of elements selected from a group consisting of readers and writers. A servo sensor is positioned towards the elements, the servo sensor being adapted for sensing a first servo track of a magnetic medium. A fence is positioned towards the servo sensor and aligned therewith in a tape travel direction. The fence serves as a conductive-debris-accumulating feature, wear-reducing feature, and cooling feature.

In another embodiment, a magnetic tape head includes a plurality of piggybacked reader and writer pairs, each reader and writer pair comprising a sensor, at least one shield positioned towards the sensor, first and second writer poles, and a coil. A servo sensor is positioned towards the reader and writer pairs, the servo sensor being adapted for sensing a first servo track of a magnetic medium. Shields sandwich the servo sensor. A fence is positioned towards the servo sensor and aligned therewith in a tape travel direction.

In yet another embodiment, a magnetic tape head includes a plurality of elements selected from a group consisting of readers and writers. A fence is positioned towards each reader and aligned therewith in a tape travel direction. As an option, the readers and writers may be interleaved.

In a further embodiment, a magnetic head includes a substrate and a reader positioned above the substrate, the reader having a sensor element and shields sandwiching the sensor element. A fence is positioned towards the reader on an opposite side thereof from the substrate, the fence being aligned with the reader in a travel direction of a magnetic medium passing thereby. In this embodiment, the fence is not an operative writer, but may be electrically connected to at least one of the shields sandwiching the reader.

Any of these embodiments may be implemented in a tape drive system, which may include a magnetic head as recited above, a drive mechanism for passing a magnetic recording tape over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

It has been observed that MR readers not having piggybacked writers are far more likely to fail due to accumulation of conductive material from the tape at low humidity than read-write transducer pairs. The magnetic head of this invention has a thin-film-deposited and relatively durable piggybacked 'fence' adjacent some or all of the sensors. The fence serves as a conductive-debris-accumulating feature, wear-reducing feature, and cooling feature. In brief, the fence is constructed of films that are more durable and less susceptible to recession than the shields surrounding a sensor element, especially a sensor element not having a writer adjacent thereto. This invention is especially suited to servo track read sensors in tape heads, as these conventionally are not fenced as described herein. Servo sensors are critical for positioning the head accurately during writing, and read errors due to resistance fluctuations will quickly cause a tape drive to stop writing. This invention also encompasses other types of magnetic heads, including interleaved heads.

Figure 1:
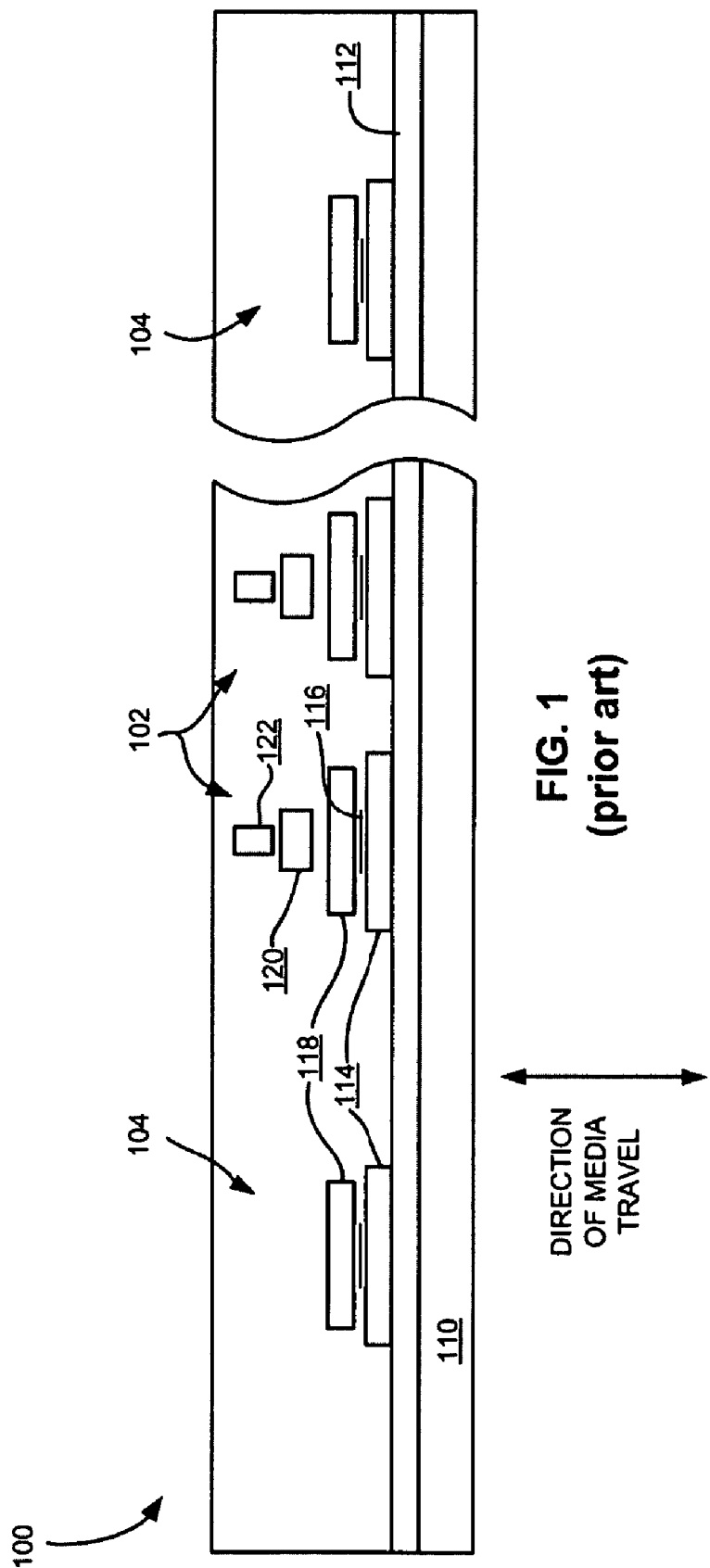
FIG. 1 is a representative tape bearing surface view of a typical multitrack tape head having a multitude of read elements and one or more servo sensors.
Figure 2A:
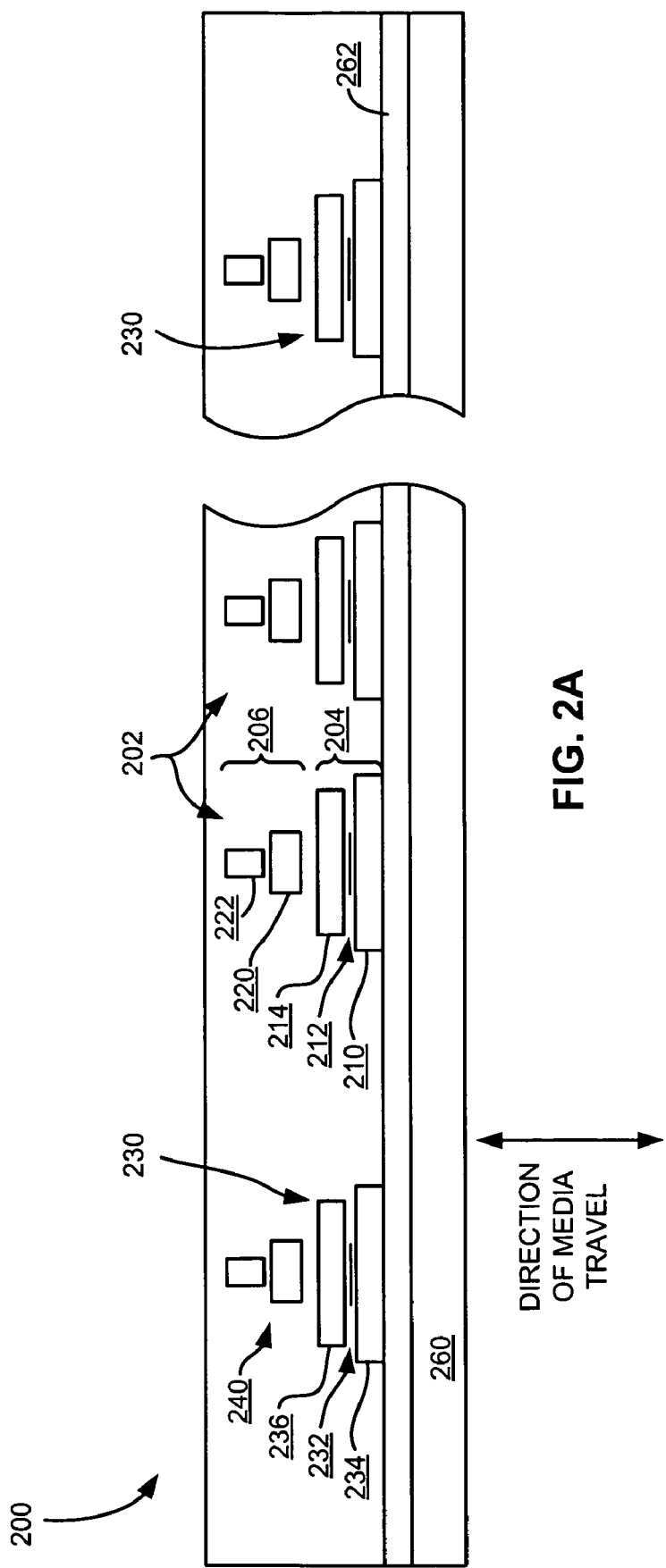
FIG. 2A is a representative tape bearing surface view of a multitrack tape head having a multitude of read elements and one or more servo sensors according to one embodiment of the present invention.

FIG. 2A illustrates a detailed portion of a magnetic tape head 200 according to one embodiment, as seen when looking at the tape bearing surface. This head is suitable for use with Linear Tape Open (LTO) systems, and is a read-while-write head assembly. As shown, the head includes several R/W pairs 202, each R/W pair including a reader 204 and a writer 206. Heads typically include several R/W pairs, such as 8, 16, 32 pairs, etc. The R/W pairs 202 as shown are linearly aligned. However, the pairs may also be aligned diagonally, staggered, etc.

Each reader 204 includes a first shield (S1) 210 typically of an iron alloy such as Al—Si—Fe (Sendust), a sensor 212 (also known as a read element) for sensing a data track, and a second shield (S2) 214 typically of a nickel-iron alloy (e.g., 80/20 Permalloy). Each writer 206 includes a coil (not shown)

and first and second writer poles (P1, P2) 220,222 typically of NiFe or other material, such as 45/55 NiFe. Note that these materials are provided by way of example only, and other materials having similar properties can be used. For instance, one or both shields 210, 214 can be formed of a cobalt-zirconium-tantalum (CZT) alloy. Ceramics, e.g., nickel zinc ferrites, are also useable to construct the shields 210, 214. Similarly, alternative materials for the writer poles include iron aluminum alloys and laminate Fe—Ni films. Also note that additional layers such as insulation between the shields and/or pole tips and surrounding the sensor, as well as composition and constructions of the R/W pair components, are well known and so description thereof has been omitted.

One or more servo readers 230 are positioned on the outside of the array of R/W pairs 202. Each servo reader 230 includes a servo sensor 232 and a pair of shields 234, 236 sandwiching the serve sensor 232. The servo readers 230 follow servo tracks for the particular data "band" of the tape being read or written to, their signal being used to keep the head aligned with the data band. The tape may have a single or many bands, and each band may have one or more servo tracks associated with it.

As mentioned above, tape heads are not currently constructed with a writer over the servo sensor 232. As a result, debris from the tape passing thereacross has been found to accumulate between the shields 234, 236, causing a short between the servo sensor 232 and one or both shields 234, 236. The inventors have found that several benefits are obtained by placing a fence 240 in close proximity to the servo sensor 232. For instance, not only is wear on the servo reader 230 reduced, but shorting due to debris accumulation is significantly reduced. The servo sensor 232 also runs cooler, as the fence 240 acts as a heat sink. Cooling in turn reduces thermal degradation of the sensor.

Referring again to FIGS. 2A and 2B, any desired material can be used to construct the fence 240. The fence 240 can be made using films having the same or similar basic composition and geometry as the writer poles 220, 222 in a conventional piggybacked read-write head. However, a piggybacked fence as shown in FIG. 2A and in other embodiments described herein is not necessarily a transducer. Rather, it could be a structure resembling a writer (including a functional writer). Adding a fence that also functions as an active writer provides the advantage that it can encode servo or other data, as well as erase.

Figure 3:
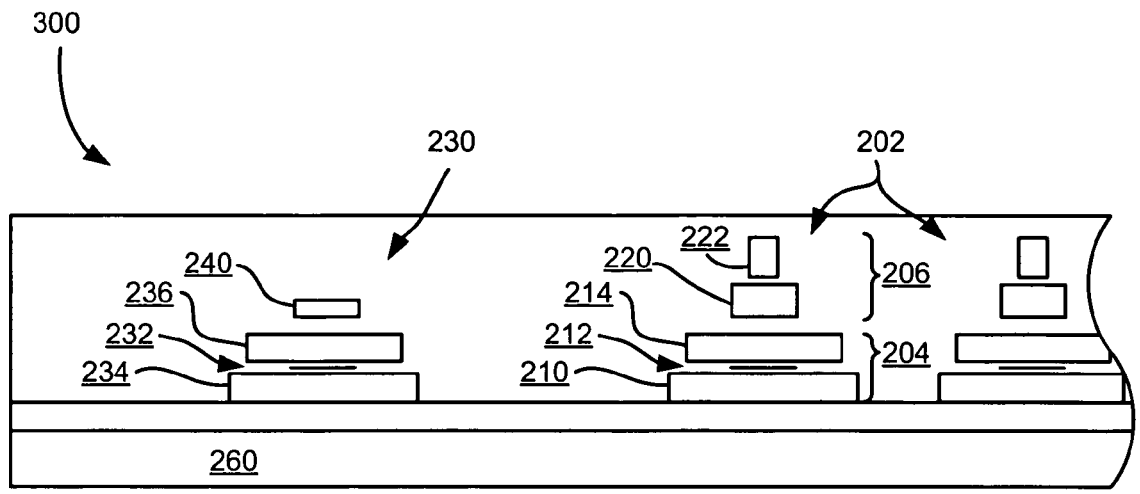
FIG. 3 is a representative tape bearing surface view of a multitrack tape head according to another embodiment.
Figure 4:
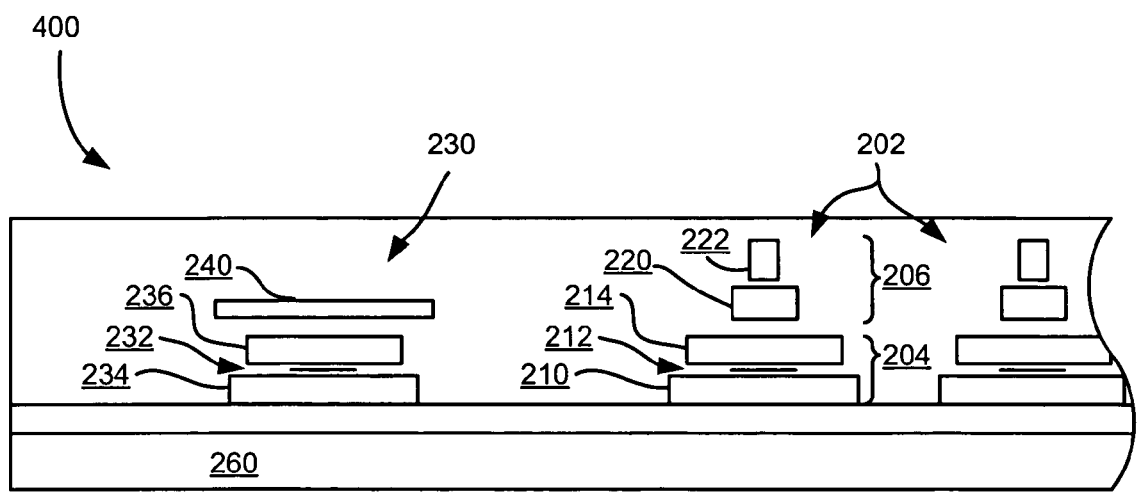
FIG. 4 is a representative tape bearing surface view of a multitrack tape head according to a further embodiment.

The fence can also be a nonoperative writer, for example, with no leads, no coil, no pads, or other feature (or lack thereof) that makes the writer nonoperative. The fence can more simply be only the P1 and/or P2 thin films used in the writer poles but fabricated as a simple shape, e.g., a rectangle. FIG. 3 illustrates a head 300 similar to that of FIG. 2A, where the fence 240 is rectangular shaped, and smaller than the shields 234, 236 of the servo sensor 232. FIG. 4 illustrates a head 400 similar to that of FIG. 2A, where the fence 240 is generally rectangular shaped. Note also that the fence 240 in FIG. 4 is wider than the shields 234, 236 of the servo sensor 232.

In a certain embodiments of the present invention, the fence 240 is constructed of a material having greater wear resistance than the shields 234, 236 flanking the servo sensor 232. In hard disk drive heads and tape heads, the second of two reader shields is generally permalloy (80% Ni, 20% Fe), which is well known to wear relatively rapidly when run on tape, especially in comparison to the writer poles when constructed of a high moment alloy of nickel and iron (e.g., 45% Ni, 55% Fe). Thus, where the fence is constructed of NiFe as used in the writers, the NiFe fence is more durable than the permalloy and sendust shields surrounding the sensors, and so the fence protects the servo reader from wear, accumulation of debris, etc. And the rate that the shields and servo sensor wear down decreases over time, as the fence will wear more slowly, and thus provide more protection as the read element and shields become slightly recessed relative to the tape bearing surface of the fence. The fence, which then protrudes above the servo reader shields, protects the servo reader from accumulation of debris thereon. The protrusion also serves to improve fenced reader wear characteristics. Further, since the fence is essentially a metal plate in close proximity to the sensor shield, it assists in conducting heat away from the servo sensor, thereby allowing the sensor to run cooler.

The fence in any of the embodiments described herein can be formed during thin film buildup by any standard process. For instance, a combination of photolithography and deposition or plating can be used to form the fence. In an example, a mask is formed on the wafer, the mask having openings where the fence and the lower writer poles are to be formed. Then mask/pole material is sputtered, plated, etc. to fill the mask openings. Then the mask is removed using standard liftoff techniques, which typically include adding a solvent to dissolve a liftoff layer and chemical-mechanical polishing.

The fence can also be formed by milling the wafer to define a void. The void is then filled with fence material, e.g., by plating or deposition. The plating or deposition would preferably be performed with a photolithographic mask protecting the remainder of the head. In another example, a premade fence can be inserted in a void and adhesively or frictionally coupled to the head.

The fence in any of the embodiments described herein can also be added after creation of the head. For instance, the ABS of the head can be milled, e.g., by ion milling through apertures in a photolithographic mask to create a void starting in the ABS and extending generally towards the back of the sensor. The void is then filled with fence material, e.g., by plating or deposition. The plating or deposition would preferably be performed with a photolithographic mask protecting the remainder of the head. In another example, premade fence can be inserted in a void and adhesively or frictionally coupled to the head.

One embodiment of the present invention includes a feature for preventing electrostatic discharge and/or shorting. In tape systems, the shields can become charged by the action of the tape brushing thereacross. If the shields are floating (not connected or grounded), they will charge up to a high voltage (e.g., 10V), then discharge. The backside of the tape does not have a magnetic coating. Rather, the backside of the tape is rougher than the magnetic side. The roughness assists in winding the tape onto a reel. To make the backside of the tape rough, carbon particles are formed thereon. The carbon itself can flake off and run across the tape-head interface, creating electrically conductive bridging. The particles can create enough of a bridge that a shield can discharge into the sensor, creating a spike in the signal. A conductive pairing can be used to equalize the charge of the piggyback fence and the nearest shield of the servo reader. The conductive pairing can be used in conjunction with a charge clamp circuit. A charge clamp circuit removes charge from the reader shields, and keeps the shields at roughly the same voltage as the sensor, as described below.

Figure 2B:
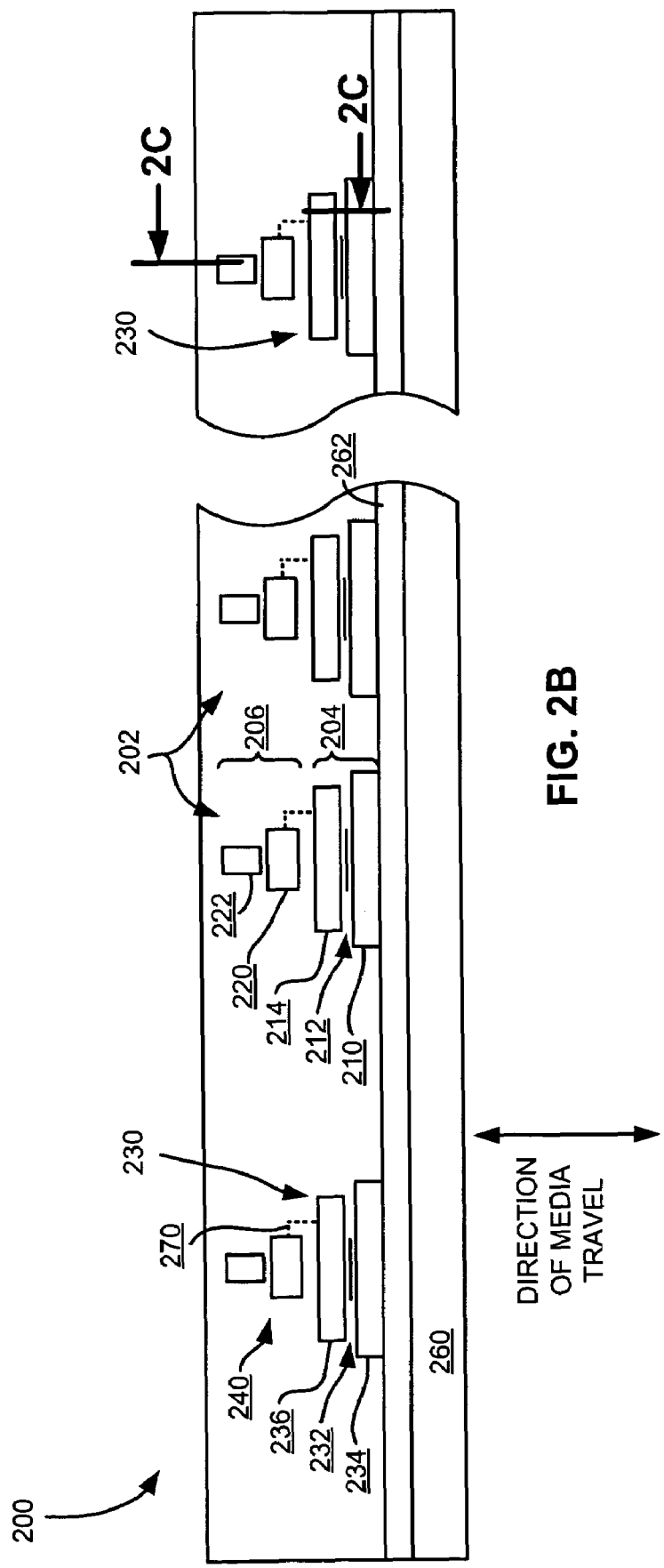
FIG. 2B is a representative tape bearing surface view of a multitrack tape head having a multitude of read elements and one or more servo sensors according to another embodiment of the present invention.

With reference to FIG. 2B, a conductive pairing electrical connection 270 between one or both of the servo sensor shields 234, 236 and the fence films 240 is made. In brief, the electrical connection 270 further optimizes head wear by equalizing the voltage environments of the fence and servo sensor shields to reduce electrochemical/mechanical erosion of the wear-resistant air bearing surface (ABS) layer. This is accomplished by adding an electrical connection 270 between adjacent electrically conductive sensor shield(s) and the fence. For thin-film multi-track R/W arrays, such a connection is preferably provided independently for each R/W pair in the array, and for each servo sensor and fence pair.

Figure 2C:
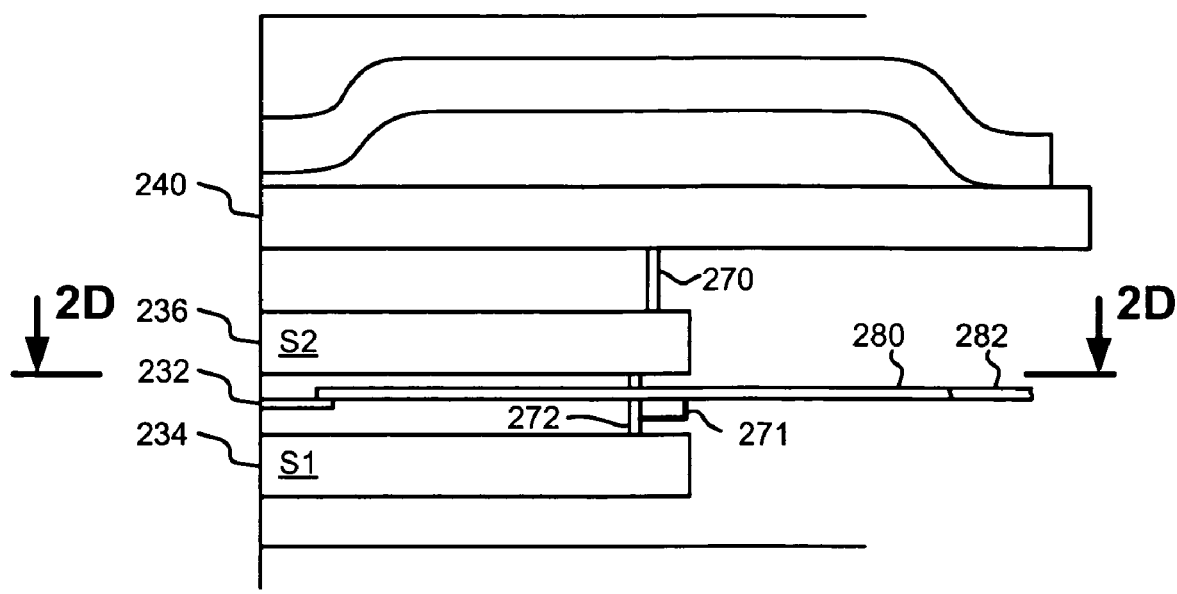
FIG. 2C is a partial cross sectional view taken from Line 2C-2C of FIG. 2B.
Figure 2D:
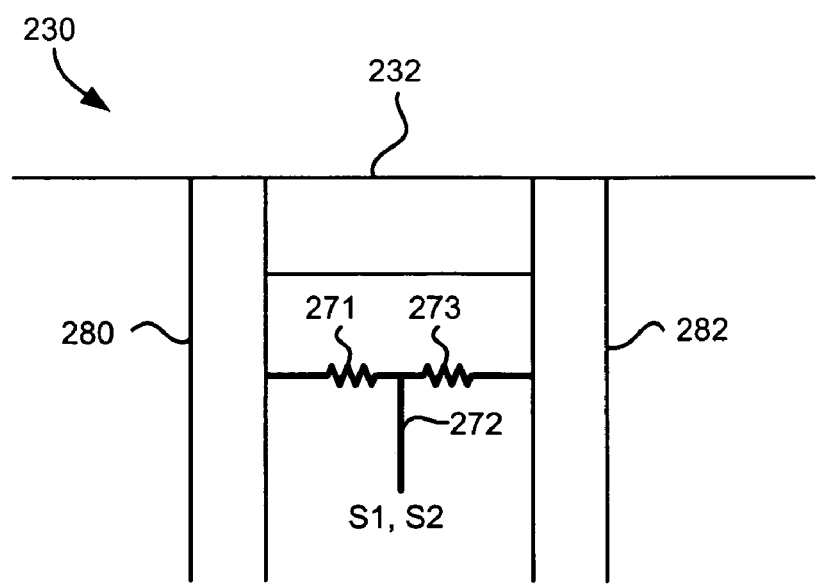
FIG. 2D is a partial cross sectional view taken from Line 2D-2D of FIG. 2C.

The following description of conductive pairing and charge clamps will be described in terms of implementation with the servo reader 230, it being understood that the conductive pairing and charge clamp connections may be implemented in the data reader/writer pairs 202 as well. According to an embodiment of the invention, within each servo reader 230, the reader shields 234, 236 may also be connected to the leads 280, 282 of the sensor 232 via a circuit 272 in a configuration referred to as a charge clamp, as shown in FIGS. 2C-2D. As shown in FIG. 2D, resistors 271, 273 are positioned between the leads 280, 282, thereby forming a short across the leads 280, 282, but not significantly affecting MR performance. Resistors 271, 273 are preferably of equal magnitude for reasons which will soon become apparent, but may be of differing magnitude. The resistors 271, 273 may have a resistance of less than about 1000 kilo-ohms (kOhms). Also note that resistors 271, 273 may each be formed of multiple resistors.

The shields 234, 236 are coupled to the circuit at a point between the resistors 271, 273. The circuit acts as a voltage divider, where the voltage of the shields is at a level near a midpoint between the lead voltages, e.g., $V_{midpoint}=(V_{lead1}+V_{lead2})/2$. This midpoint is about the voltage of the midpoint of the sensor 232 between the leads 280, 282. Thus, the sensor 232 and shields 234, 236 are at about the same voltage. Because they are at about the same voltage, tribological effects such as wear, corrosion and accumulations are reduced. Further, the chance of an electrical discharge, e.g., spark, between the shields 234, 236 and the sensor 232 is minimized.

As schematically illustrated in FIGS. 2C-2D, an electrical connection 270 is established between the electrically-conductive MR element S1 shield 236 and the immediately-adjacent portion of the fence 240 (or lower pole piece 220 in the R/W pairs 202). Electrical connection 270 and charge clamp circuit 272 are preferably established for each piggyback servo reader/fence pair and are implemented in FIG. 2C by the electrical conductor 270 and charge clamp circuit 272, which are merely one of many useful means for conductively coupling the shields 234, 236 and the fence 240.

The electrical connections exemplified by electrical conductor 270 and charge clamp circuit 272 (FIG. 2D) may be made independently for each servo reader 230 and reader-writer pair 202. Electrical conductor 270 and charge clamp circuit 272, or portions thereof, are preferably non-magnetic and may be formed by depositing a layer of conductive metal, such as tantalum, copper or gold, or any other useful material of low to intermediate resistivity. The electrical conductor 270 and charge clamp circuit 272, or portions thereof, can also be formed by creating a via which is filled with material.

In one embodiment of the present invention, conductor 270 is formed by a roughly planar deposition of a nonmagnetic metal, e.g., Ta, is formed between S2 236 and P1 240 (FIG. 2C). In other words, the Ta is sandwiched between the S2 and P1 layers and is substantially coextensive with large portions thereof, as opposed to having a single point of contact as in a "via" connection.

Other embodiments of the present invention implement the electrical conductor 270 using a magnetic metal (e.g., NiFe) having a location of connection which may have one or more of the following properties: (i) positioned "far away" from the sensor, i.e., far enough not to substantially interfere with operation of the sensor; (ii) positioned outside the outer diameter of the outermost turn of the coil; and (iii) symmetric to the magnetic features of both the reader and the writer. Note: the plane of symmetry of the electrical conductor 270 is preferably generally perpendicular to the tape bearing surface of the head. Positioning the magnetic metal conductor 270 far from the sensor minimizes magnetic disturbance to the reader sensor. Positioning the electrical conductor 270 outside the outer diameter of the outermost turn of the coil minimizes magnetic coupling from the writer coil, when energized during writing, to the (magnetic) electrical conductor 270, thereby minimizing magnetic disturbances to the reader structures. Maintaining magnetic symmetry avoids unwanted alteration of the reader's magnetic bias, which could otherwise result from unsymmetrical geometric designs. An electrical conductor 270 made of a magnetic metal is preferably formed of a single via connection, or multiple via connections, between the two magnetic planes (S2 236 and P1 240 (FIG. 2C)).

Electrical conductor 270 and charge clamp circuit 272 may include a wafer-deposited thin film resistor. Electrical conductor 270 may, for example, have a resistance in the range from about 5 kOhms to about 50 kOhms or more. The electrical conductor 270 preferably has a resistance of less than about 1000 kOhms. Larger resistances are not preferred because tribocurrent flowing from tape to ground through the connection can be of the order of, e.g., 100 nanoamperes. This would produce a voltage difference between fence 240 and reader shield 236 of 0.1 volts, which is large enough to produce tribological effects.

In operation, the presence of electrical conductor 270 and charge clamp circuit 272 clamps the electrical potential of the fence 240 (coupled together at the back gap) to that of MR element shield 236, which is clamped to the midpoint of the voltage potentials between the MR electrical lead conductors 280, 282. This arrangement forces the voltage potentials to be the same for both the servo reader shields 234, 236 and the fence 240, thereby reducing the differences in wear between the fence 240 and the servo reader 230. By equalizing the electrical environment over adjacent structures, the erosion of the wear-resistant alumina surface and other related component is equalized. This occurs, for example, because any such wear arising from electrically-enhanced alumina erosion is equalized. Sputtered alumina is known to be less wear-resistant in acidic and basic environments, such as in conjunction with the head-tape interface at the ABS, than in neutral environments. The inventors have found that this conjectured chemical-mechanical mechanism appears to be influenced by the local electrical environment, which is controlled in the piggyback MR head assembly of this invention by equalizing the robustness of the write heads and the read heads.

In another embodiment, the electrical conductor couples the fence directly to the charge clamp circuit. Also note that conductor in this embodiment may also include a resistor, as mentioned above. Such an embodiment may be easier to fabricate in some situations, such as where the connections are made behind the shields so as not to disturb the shields.

One skilled in the art of magnetic recording will appreciate that a single R/W pair resembles a hard disk drive head, and so will understand that the teachings found herein would also apply to other magnetic heads and systems including hard disk drive heads and systems.

Figure 5:
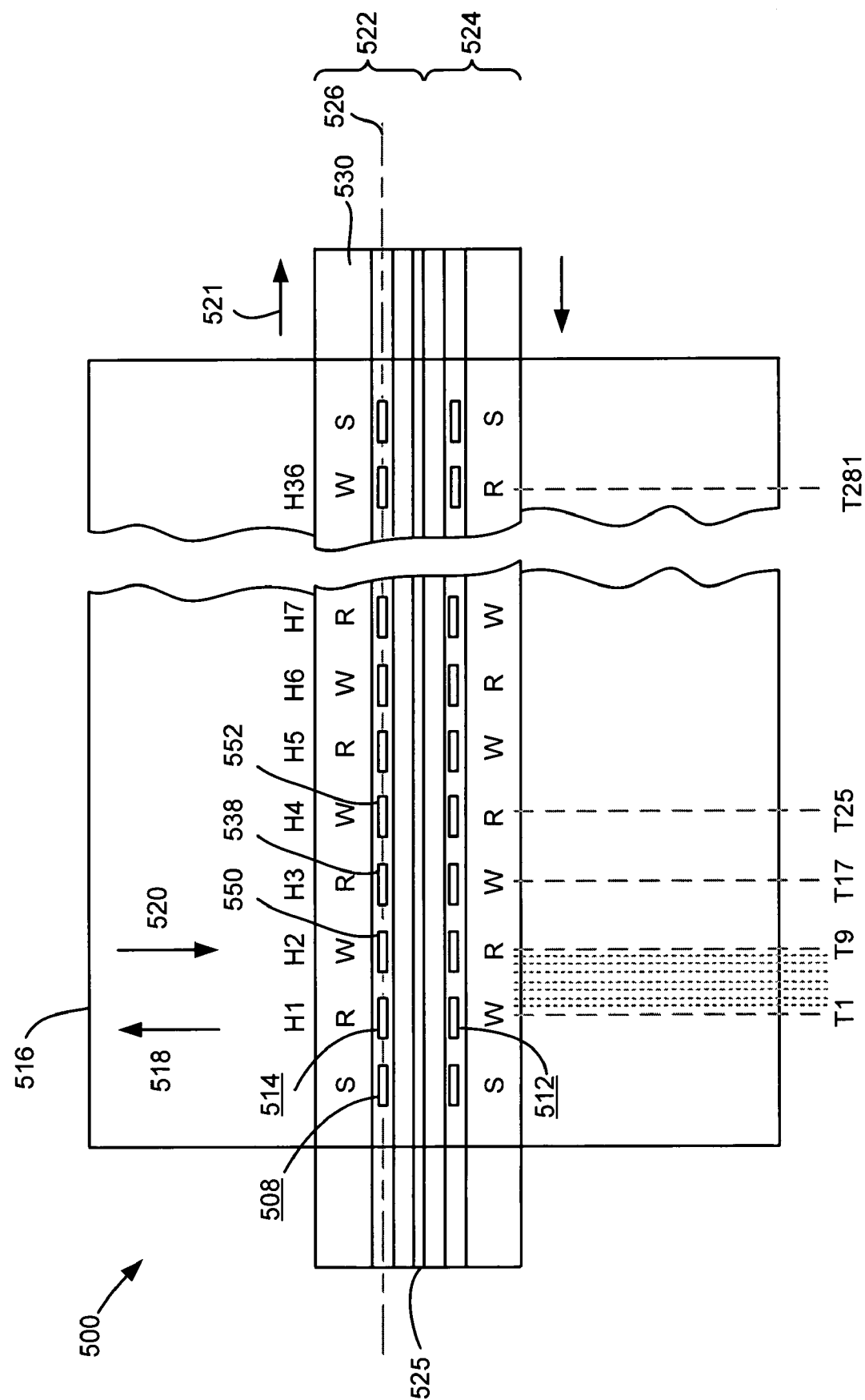
FIG. 5 illustrates a front view of the tape bearing surface of an interleaved magnetoresistive (MR) head assembly in relation to a magnetic tape storage medium.

FIG. 5 illustrates another embodiment of a tape head assembly 500, this time of an MR interleaved head assembly.

As noted below, interleaved head assemblies can take advantage of the protective fence, not only for servo readers, but also for the data readers.

The data readers 514 are marked "R" and the writers 512 are marked "W". The readers and writers are disposed in alternating fashion to form a single set of thirty-eight (for example) read/write track-pairs, exemplified by the R/W track-pair 512-514. As used herein, the term "alternating" is intended to include other formats. For example, one format provides that the odd-numbered heads H1, H3, H5 etc. are operative during forward tape movement, while the even-numbered heads H2, H4, H6 etc. are operative during the opposite direction of tape movement. In contrast to the piggyback configuration described above, readers 514 and writers 512 in the interleaved head assembly are formed on about the same plane oriented perpendicular to the tape travel direction. Servo readers 508 are marked with "S", and are found on opposite ends of each array or readers and writers.

Generally, the length of the magnetic tape medium 516 moves in either a forward or reverse direction as indicated by the arrows 518 and 520. Head assembly 500 is shown in FIG. 5 as if magnetic tape medium 516 were transparent, although such tape medium normally is not transparent. Arrow 518 designates a forward movement of tape medium 516 and arrow 520 designates a reverse direction. Magnetic tape medium 516 and interleaved MR head assembly 500 operate in a transducing relationship in the manner well-known in the art. Other formats usable in the practice of this invention are considered to be within the teaching of this invention.

Each of the head elements in head assembly 500 may operate over a plurality of data tracks in magnetic tape medium 516, as may be appreciated with reference to the data tracks T1, T9, T17, etc. in FIG. 5, which shows an exemplary 288-track scheme having a data track density on magnetic tape medium 516 of eight times the recording element density of R/W track-pairs H1, H2, . . . H36 in MR head assembly 500. Tracks T9, T25, . . . T281 may be written with one pass of magnetic tape medium 516 in direction 518 over even-numbered R/W track-pairs H2, H4, . . . H36 and then tracks T1, T17, . . . T273 written on a return pass of magnetic tape medium 516 over the odd-numbered R/W track-pairs H1, H3, . . . H35 by moving the lateral position of MR head assembly 500 in the direction of the arrow 521 by a distance equivalent to one track pitch (T1-T2), which is about 12% of the R/W track-pair spacing (H1-H2). Interleaved MR head assembly 500 includes two thin-film modules 522 and 524 of generally identical construction that are coupled together by an adhesive layer 525.

Figure 6:
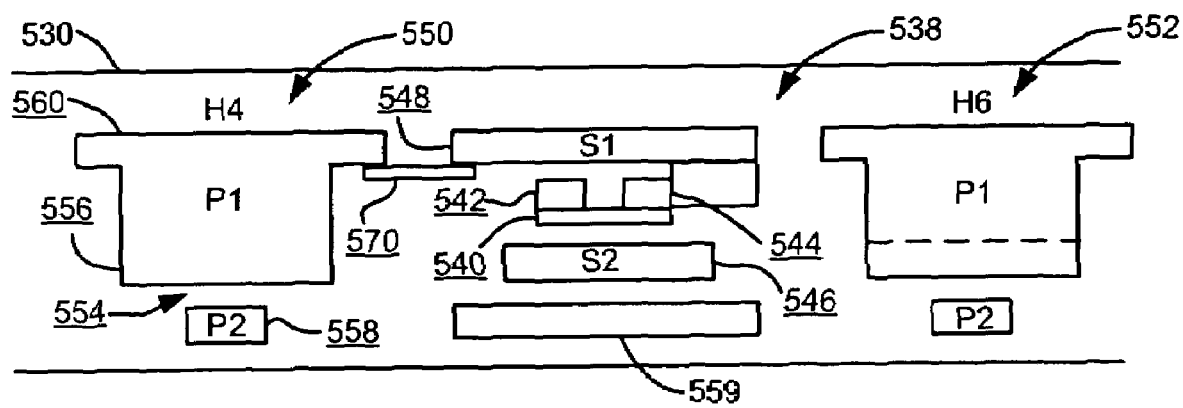
FIG. 6 illustrates a cutaway portion of the MR head assembly from FIG. 5.

FIG. 6 shows in detail a portion of substrate 530 from FIG. 5, including portions of three exemplary R/W head gaps on head-gap line 526, which are aligned with track-pairs H3-H5 substantially as shown. The thin-film elements shown in FIG. 6 are illustrated showing submicron detail in the usual manner and are not to scale. Considering first the reader 538 at track-pair H5, a magnetoresistive (MR) sensor element 540 is disposed between the two MR element (S2 and S1) shields 546 and 548, with each MR sensor end coupled to an electrical lead conductor 542 and 544.

In FIG. 6 (not to scale), read head 538 is seen to be disposed between the two writers 550 and 552 positioned for writing data on track-pairs H4, H6, each adjacent to track-pair H6, substantially as shown. Write head 552 is substantially identical to write head 550, which includes a write-gap 554 defined by two spaced magnetic pole (P1 & P2) tips 556 and 558 wherein the pole tip 556 is a lower component of a pole piece and 560 represents an upper component of the pole piece. The upper pole piece component 560 may be deposited using the same material and deposition cycle as MR element S1 shield 548 to improve manufacturability.

With continued reference to FIG. 6, a fence 559 is formed adjacent the reader 538. Although not shown, a fence may also be formed adjacent each writer 550,552. Also, as schematically illustrated in FIG. 6, an electrical connection 570 is established between the electrically-conductive MR element S1 shield 548 and the immediately-adjacent upper pole piece component 560 (and thereby to magnetic pole tip P1). Electrical connection 570 is established for each laterally-adjacent R/W head pair along head-gap lines 526 and 528 (FIG. 5) and is implemented in FIG. 6 by the electrical conductor 570, which is merely one of many useful means for conductively coupling the shield 548 and the pole piece which has upper and lower components 556 and 560. In accordance with this invention, the electrical connection exemplified by electrical conductor 570 is made independently for each reader-writer pair along both head-gap lines 526 and 528 of substrates 530 and 532 (FIG. 5). Electrical conductor 570 (FIG. 6) is preferably non-magnetic and may be formed by depositing a layer of conductive metal, such as tantalum, copper or gold, or any other useful material of low to intermediate resistivity. Electrical conductor 570 may, for example have a resistance in the range from about 5 kilohms to about 50 kilohms or more, and may include one or more resistors.

Implementing this invention in any type of magnetic head is no more difficult than building R/W piggybacked heads. When a head such as that shown in FIG. 2A is constructed, layers are formed on a substrate 260 in generally the following order for the R/W pairs 202: an insulating layer 262 typically of alumina, a first shield 210, a sensor 212 also known as a read element, a second shield 214, and first and second writer pole tips 220,222. During formation of the first and/or second writer poles 220,222, the fence 240 can be added. Note that in some embodiments, the second shield 214 and the first pole 220 can be combined in a single structure. Note also that additional layers may be added and others removed per the desires of the designer.

To add the fence to a head of the type shown in FIG. 5, the fence can be easily formed by lithography and deposition. In one illustrative process, once the readers are formed, the wafer is masked to define exposed fence sites above the shields. Conventional photolithography techniques can be used to define the mask. Fence material is deposited in the exposed fence sites via a process such as sputtering, plating, etc. Then the mask is removed via a standard liftoff process, which may include application of a solvent to dissolve a liftoff layer of the mask followed by chemical mechanical polishing (CMP). Another illustrative process to create the fence includes masking the wafer as above, milling material from the exposed fence sites to create a void, then depositing material in the void via sputtering, plating, etc. Then the mask is removed as above. CMP may be performed to planarize the fence.

Figure 7:
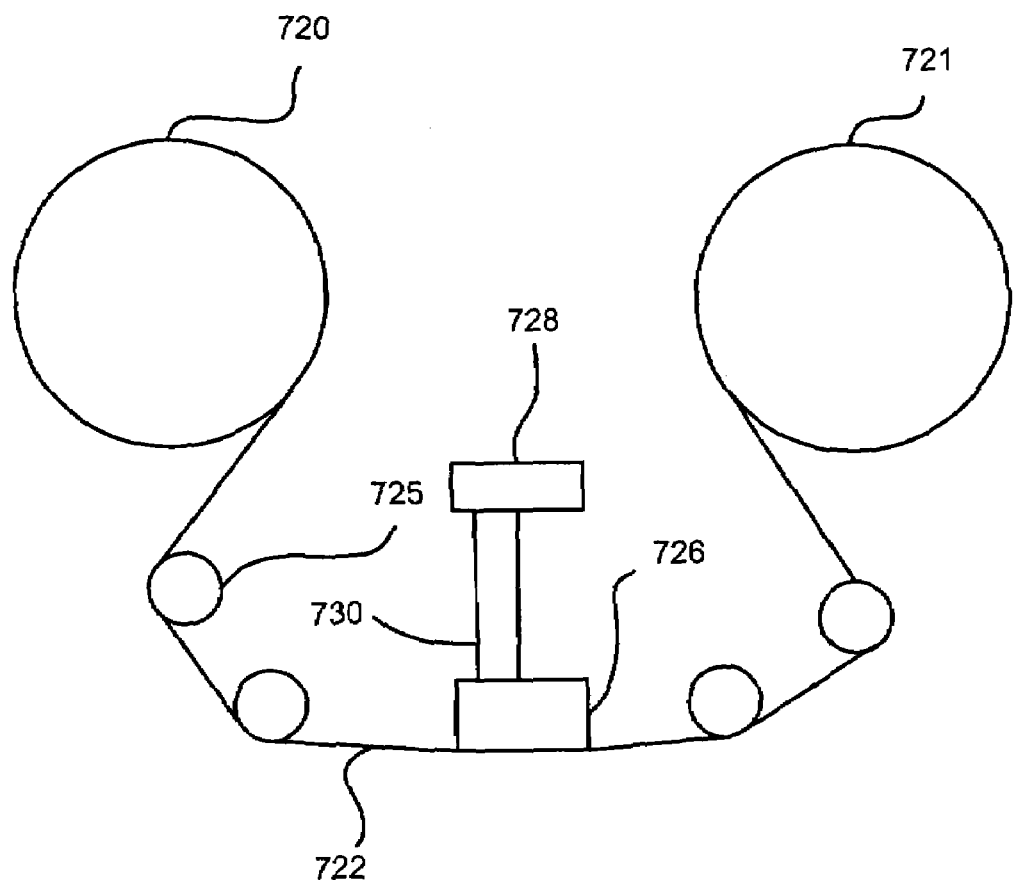
FIG. 7 is a schematic diagram of the tape drive system.

FIG. 7 illustrates a simplified tape drive which may be employed in the context of the present invention. While one specific implementation of a tape drive is shown in FIG. 7, it should be noted that the embodiments of the previous figures may be implemented in the context of any type of drive (i.e. hard drive, tape drive, etc.)

As shown, a tape supply cartridge 720 and a take-up reel 721 are provided to support a tape 722. These may form part of a removable cassette and are not necessarily part of the system. Guides 725 guide the tape 722 across a preferably bidirectional tape head 726, of the type disclosed herein. Such tape head 726 is in turn coupled to a controller assembly 728 via a connector cable 730. The controller 728, in turn, controls head functions such as servo following, write bursts, read functions, etc.

A tape drive, such as that illustrated in FIG. 7, includes drive motor(s) to drive the tape supply cartridge 720 and the take-up reel 721 to move the tape 722 linearly over the head 726. The tape drive also includes a read/write channel to transmit data to the head 726 to be recorded on the tape 722 and to receive data read by the head 726 from the tape 722. An interface is also provided for communication between the tape drive and a host (integral or external) to send and receive the data and for controlling the operation of the tape drive and communicating the status of the tape drive to the host, all as will be understood by those of skill in the art.

Key advantages of the fence are improved read sensor wear durability and reliability, and lower operating temperature. Cooler sensors generally show less tape-lifting stain buildup, corrosion, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic tape head, comprising:
   a plurality of elements selected from a group consisting of readers and writers;
   a servo sensor positioned towards the elements, the servo sensor being adapted for sensing a first servo track of a magnetic medium; and
   a fence positioned towards the servo sensor and aligned therewith in a tape travel direction,
   wherein a tape bearing surface of the fence and a tape bearing surface of the servo sensor lie on a same plane.

2. The head as recited in claim 1, further comprising a second servo sensor adapted for sensing a second servo track, and a second fence positioned towards the second servo sensor and aligned therewith in the tape travel direction.

3. The head as recited in claim 1, further comprising shields sandwiching the servo sensor, wherein the fence is constructed of a material having a greater wear resistance than the shields.

4. The head as recited in claim 3, wherein the fence has a width greater than at least one of the shields as measured in a direction transverse to the tape travel direction.

5. The head as recited in claim 3, wherein the fence has a width less than at least one of the shields as measured in a direction transverse to the tape travel direction.

6. The head as recited in claim 3, wherein the fence is electrically coupled to at least one of the shields.

7. The head as recited in claim 1, wherein the fence is electrically conductive.

8. The head as recited in claim 1, wherein the fence resembles a structure of two writer poles.

9. The head as recited in claim 8, wherein the fence has no leads.

10. The head as recited in claim 8, wherein the fence has no coil.

11. The head as recited in claim 1, wherein the writers include poles, wherein the fence is constructed of a same material as one of the poles.

12. The head as recited in claim 1, wherein each element is a piggybacked reader and writer pair.

13. A tape drive system, comprising:
    a magnetic head as recited in claim 1;
    a drive mechanism for passing a magnetic recording tape over the magnetic head; and
    a controller electrically coupled to the magnetic head.

14. A magnetic tape head, comprising:
    a plurality of piggybacked reader and writer pairs, each reader and writer pair comprising a sensor, at least one shield positioned towards the sensor, first and second writer poles, and a coil;
    a servo sensor positioned towards the reader and writer pairs, the servo sensor being adapted for sensing a first servo track of a magnetic medium;
    shields sandwiching the servo sensor; and
    a fence positioned towards the servo sensor and aligned therewith in a tape travel direction, wherein the fence is constructed of a same material as poles of the writers.

15. A tape drive system, comprising:
    a magnetic head as recited in claim 14;
    a drive mechanism for passing a magnetic recording tape over the magnetic head; and
    a controller electrically coupled to the magnetic head.

* * * * *